United States Patent
Marsh et al.

(10) Patent No.: US 7,077,481 B2
(45) Date of Patent: Jul. 18, 2006

(54) SPRING BRAKE MODULATING RELAY VALVE

(75) Inventors: Andrew Marsh, Elyria, OH (US); John Kemer, Avon Lake, OH (US); Charles Eberling, Wellington, OH (US); Dave Knight, Avon Lake, OH (US); Richard T. Ross, Wakeman, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 10/646,349

(22) Filed: Aug. 22, 2003

(65) Prior Publication Data

US 2004/0119332 A1   Jun. 24, 2004

Related U.S. Application Data

(63) Continuation of application No. 09/579,086, filed on May 25, 2000, now Pat. No. 6,769,744.

(51) Int. Cl.
*B60T 15/02* (2006.01)

(52) U.S. Cl. .................. 303/40; 303/63; 303/118.1; 137/627.5

(58) Field of Classification Search ............ 303/3, 303/7, 13, 15, 20, 40, 57, 28, 63, 118.1, 22.4, 303/42, 122, 69, 70, 71; 137/627.5, 102, 137/512; 188/513, 170; 11/11
See application file for complete search history.

(56) References Cited

U.S. PATENT DOCUMENTS

| 3,836,209 A | 9/1974 | Neisch |
| 3,861,754 A | 1/1975 | Kruke et al. |
| 3,862,782 A * | 1/1975 | Horowitz et al. ............ 303/40 |
| 3,902,764 A | 9/1975 | Sebo |
| 3,937,975 A | 2/1976 | Yanagawa et al. |
| 3,944,294 A | 3/1976 | Masuda et al. |
| 4,003,605 A | 1/1977 | Fannin |
| 4,017,125 A * | 4/1977 | Durling ......................... 303/7 |
| 4,080,004 A * | 3/1978 | Ury ............................... 303/9 |
| 4,145,091 A | 3/1979 | Bueler et al. |
| 4,368,926 A * | 1/1983 | Bartholomew ................ 303/7 |
| 4,696,521 A | 9/1987 | McCann et al. |
| 4,926,907 A | 5/1990 | Fauck et al. |
| 5,042,883 A * | 8/1991 | McCann et al. ................ 303/7 |
| 5,236,250 A * | 8/1993 | Moody et al. .................. 303/7 |
| 5,409,303 A * | 4/1995 | Engelbert et al. ......... 303/118.1 |
| 5,553,928 A | 9/1996 | Hart et al. |
| 5,666,995 A * | 9/1997 | Herbst et al. ............ 137/627.5 |

(Continued)

FOREIGN PATENT DOCUMENTS

DE    3515386 A1    11/1986

(Continued)

*Primary Examiner*—Devon C. Kramer
(74) *Attorney, Agent, or Firm*—Calfee, Halter & Griswold LLP (57) ABSTRACT

A combined spring brake modulating relay valve integrates the functions of a relay valve and a modulating valve. The housing includes a valve assembly movable in response to air pressure provided to selected ports in the housing. A relay piston selectively communicates with a control port and a primary brake circuit port. A modulating piston includes surfaces selectively pressurized by the primary brake circuit port and a secondary brake circuit port. This modulates the pressure from the delivery port to thereby selectively apply the associated spring brakes if a failure is detected at the primary brake circuit port. The exhaust member selectively controls communication between the supply and delivery ports as necessary.

10 Claims, 11 Drawing Sheets

U.S. PATENT DOCUMENTS

| | | |
|---|---|---|
| 6,116,280 A | 9/2000 | Goodell |
| 6,179,391 B1 | 1/2001 | Eberling et al. |
| 6,247,764 B1 * | 6/2001 | Koelzer .................. 303/118.1 |
| 6,270,168 B1 * | 8/2001 | McCann ...................... 303/77 |
| 6,655,750 B1 * | 12/2003 | Soupal ......................... 303/9 |
| 6,729,696 B1 * | 5/2004 | Kemer et al. .................. 303/7 |
| 6,769,744 B1 * | 8/2004 | Marsh et al. ................. 303/40 |

FOREIGN PATENT DOCUMENTS

| | | |
|---|---|---|
| DE | 3722306 A1 | 1/1989 |
| EP | 0 277 465 A1 | 8/1988 |
| EP | 0 407 751 A1 | 7/1990 |
| GB | 1252 169 | 9/1969 |
| GB | 1 572 439 | 7/1980 |
| JP | 61-222855 | 10/1986 |

* cited by examiner

SPRING BRAKE MODULATING RELAY VALVE

RELATED APPLICATIONS

This application is a continuation of U.S. Ser. No. 09/579,086, now U.S. Pat. No. 6,769,744 filed on May 25, 2000 entitled "Spring Brake Modulating Relay Valve".

BACKGROUND OF THE INVENTION

1. Field of the Invention

This application relates to a combined or integrated spring brake modulating valve and relay valve that are contained in a single housing for an air brake system.

2. Discussion of the Art

Figure 1:
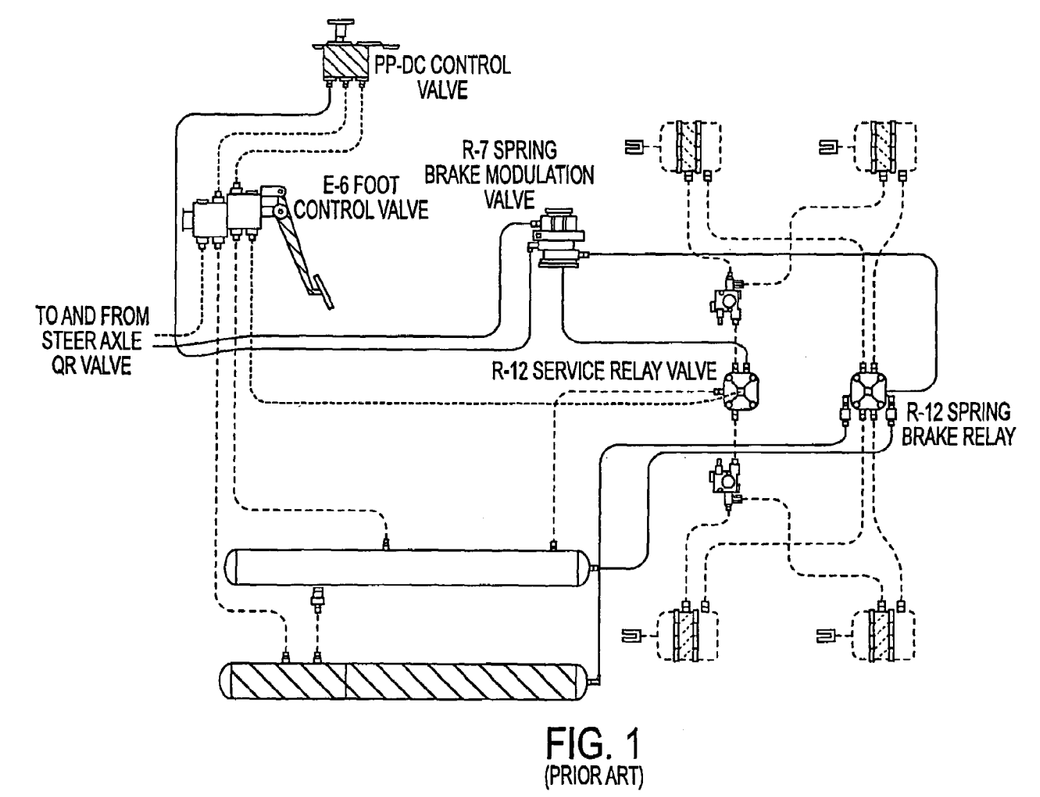
FIGS. 1 and 2 are schematic representations of prior art truck brake systems.

It is common in presently available brake circuits to employ a separate modulation valve with a relay valve or with a separate quick-release valve. For example, FIG. 1 illustrates a six-by-four straight truck, i.e., a non-towing vehicle, that employs spring brakes for parking the vehicle and in which pressurized air is delivered to the spring brakes to release them during normal operation. As shown in FIG. 1, each wheel includes a brake chamber connected with a relay valve to provide air pressure to the drive axle and selectively control service application of the brakes. In addition, each wheel includes a spring brake chamber selectively supplied with air to release a large mechanical spring typically used for the park function. Air pressure to these spring brake chambers releases the mechanical spring and allows the vehicle to roll.

As is generally known in the art, if a primary circuit fails, it is desirable to take advantage of the spring brakes, yet modulate the operation of the spring brakes through a foot control valve. This is provided by the spring brake modulation valve so that the spring brakes are selectively applied through operation of the foot control valve. The secondary circuit controls the steer axle (not shown). This arrangement provides a desired braking action and modulation of the spring brakes when required.

Figure 2:
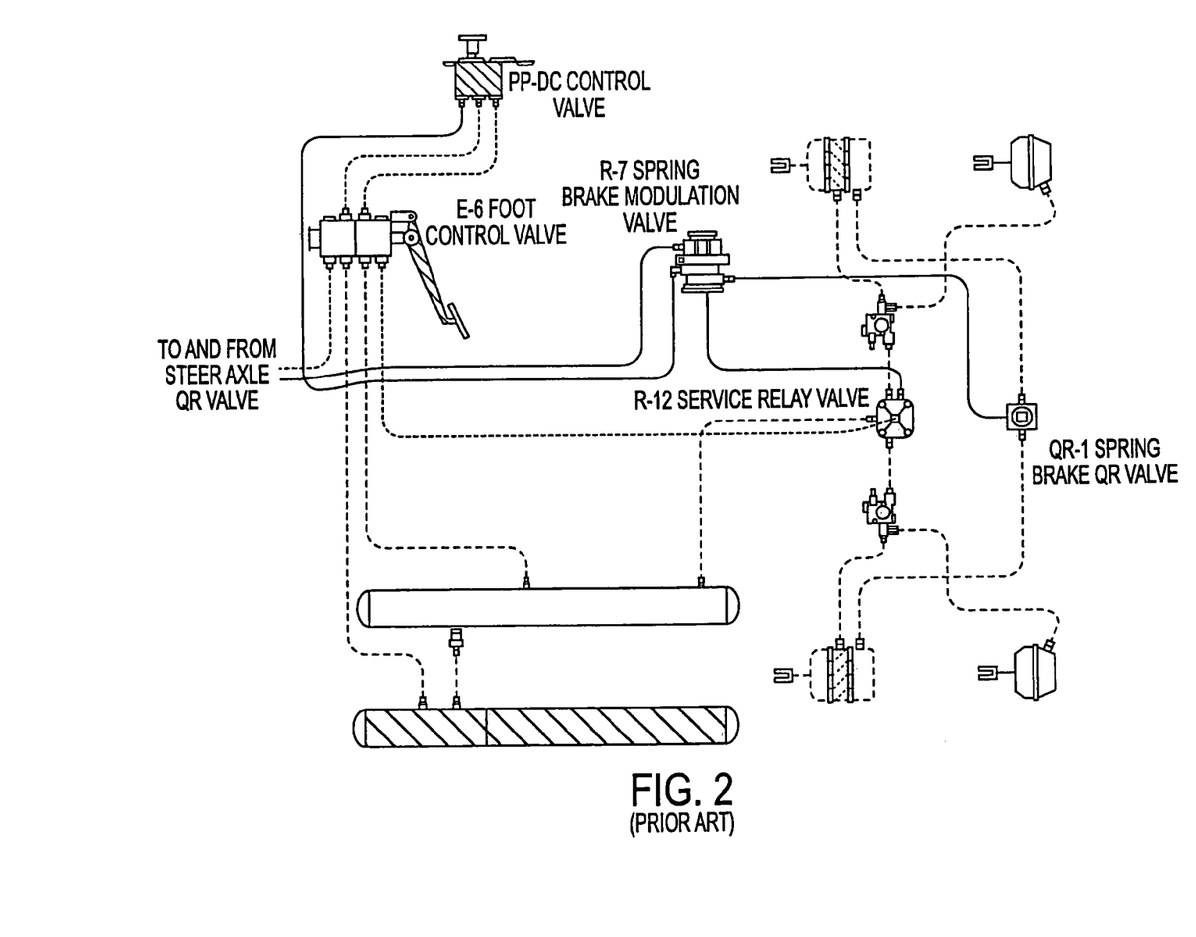

FIG. 2 illustrates a four-by-two or six-by-two straight truck configuration. Again, a spring brake modulation valve is used in conjunction with a separate spring brake quick release valve. It is evident from a comparison of FIGS. 1 and 2 that different system configurations and plumbing arrangements are thus encountered by truck manufacturers even though the brake needs are not entirely dissimilar. Thus a need exists for simplified plumbing for the truck manufacturers that provides standardized installation across all of its vehicles. In addition, enhanced performance characteristics are always desirable.

SUMMARY OF THE INVENTION

The present invention provides an integrated spring brake modulating relay valve that simplifies known, multi-component systems.

More particularly, the valve includes a housing having a control port, supply port, delivery port, exhaust port, and primary and secondary circuit brake ports that communicate with a chamber in the housing. A first piston received in the housing moves in response to pressure from the control port. A second piston monitors the primary and secondary circuits and modulates spring brake pressure if the primary circuit fails. An exhaust valve is interposed between the supply and delivery ports and controls communication with the exhaust port to selectively supply and release the spring brakes.

The first or relay piston is connected to the second or modulating piston through a biasing spring. Thus, the pistons can operate in unison but are also adapted to move relative to one another for their particular functions.

A primary benefit of the invention is the ability to integrate separate components into a multi-component arrangement in a single housing.

Another benefit of the invention resides in the improved response time, while maintaining all of the features and benefits of known systems.

Yet another benefit results from the simplified plumbing and standardized installation for truck manufacturers.

Still other features and benefits of the invention will become apparent to those skilled in the art upon reading and understanding the following detailed description.

DETAILED DESCRIPTION OF THE PREFERRED EMBODIMENTS

Figure 3:
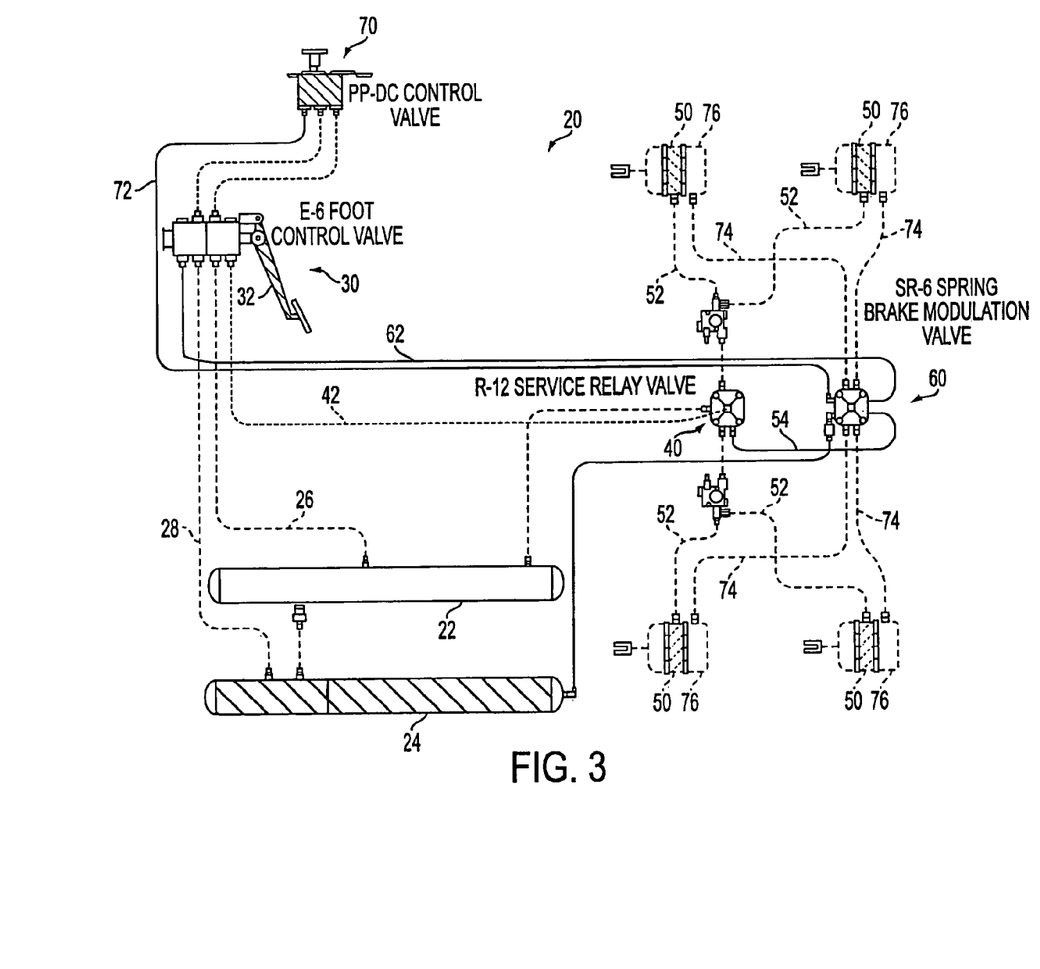
FIG. 3 is a schematic representation of the spring brake modulating relay valve of the present invention incorporated into an air brake system.

Turning first to FIG. 3, a brake system 20 includes a first or primary reservoir 22 and a second or secondary reservoir 24 that provide a supply of pressurized air for the brake system. The reservoirs are periodically charged by a compressor (not shown) and typically an air dryer is interposed between the compressor and the reservoirs to remove moisture and contaminants from the air before it is stored. Lines 26, 28 lead from the first and second reservoirs, respectively, to a foot control valve 30. The valve includes a foot pedal 32 that is selectively depressed by an operator to supply pressure from the foot control valve to a standard service relay valve 40 via line 42. The relay valve delivers normal service braking to brake chambers 50 via lines 52 associated with each of the drive wheels (not shown). In addition, line 54 extends from the relay valve to a spring brake modulation relay valve 60. In this manner, and as will be described in greater detail below, operability of the primary brake circuit is communicated to the spring brake modulation valve 60.

The foot control valve also provides a signal through line 62 to the spring brake modulation valve representative of the operation of the secondary brake circuit. Although the secondary circuit is not shown in FIG. 3 for purposes of simplicity and brevity, it is well known that a separate or secondary circuit controls braking for the steering axle from the foot control valve.

Moreover, a separately actuated control valve 70 is typically mounted in the operator compartment, such as on the dashboard. Again, as is known in the art, the control valve 70 provides a control signal (pneumatic signal) through line 72. That control signal cooperates with a spring brake modulating valve, here combined in the spring brake modulation relay valve 60, to provide pressurized air through lines 74 to the spring brake chambers 76 and thereby release the mechanical spring brakes (not shown).

Figure 4:
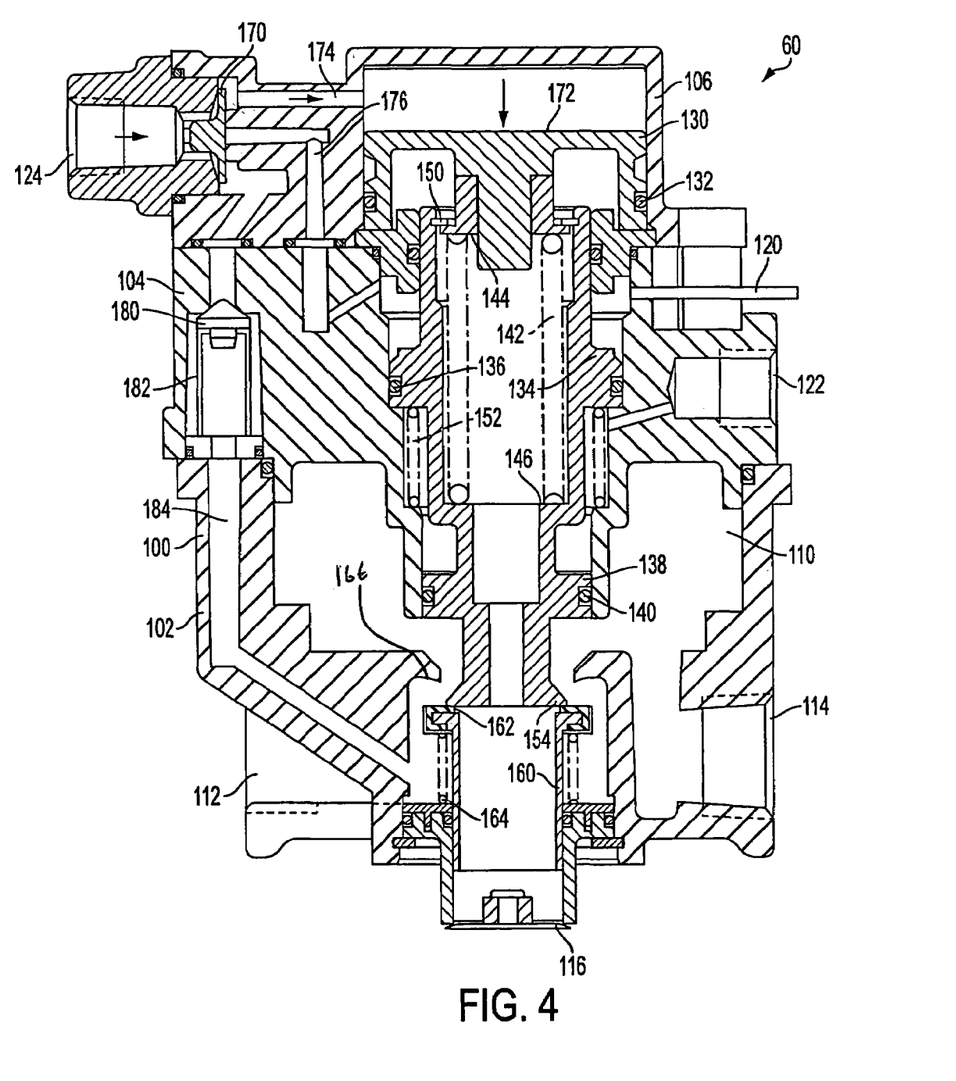
FIG. 4 is a sectional view through the spring brake modulating relay valve illustrating relative positions of the valve components during a system charging.

With this brief overview of the brake system, attention is turned to FIG. 4 where the details of the structure and function of the combined spring brake modulating relay valve 60 is shown in greater detail. It includes a housing 100 which, in this embodiment, includes a first or lower housing portion 102, a second or intermediate housing portion 104, and a third or upper housing portion 106. An internal cavity or valve chamber 110 selectively communicates with a number of ports provided in the housing. For example, a supply port 112, delivery port 114, and exhaust port 116 are all formed in the lower housing portion 102. In the intermediate housing portion, a primary brake circuit port 120 and a secondary brake circuit port 122 are provided while a control signal port 124 is provided in the upper housing portion.

A first or relay piston 130 includes a seal member such as O-ring 132 for sealing, sliding engagement in the housing. A second or modulating piston 134 likewise includes a seal member, such as O-ring, 136 for sliding sealing engagement within the housing. A lower extension of the modulating piston includes an auxiliary piston 138 having an O-ring seal member 140. A first biasing member or spring 142 engages an internal shoulder 144 of the relay piston 130 at one end and an internal shoulder 146 of the modulating piston at the other end. The spring permits the relay and modulating piston to move as a unit under certain pressure conditions. On the other hand, a retention ring 150 provides an abutment surface for the opposite face of shoulder 144 to define the engagement between the first and second pistons in the absence of air pressure. In addition, a second biasing member or spring 152 is interposed between the housing and the modulating piston for urging the valve assembly toward a first or upper position.

The lower end or modulating end of the second piston includes a seat portion 154 adapted to sealingly engage an exhaust valve 160. As shown in FIG. 4, the exhaust valve is closed as a result of the seat portion 154 engaging a seal surface 162 of the exhaust valve. The exhaust valve is normally urged toward a seated position with the housing via spring 164. When seated against the housing and forming a lap seal therewith, the supply port 112 cannot communicate with the delivery port 114 as will be described further below.

A check valve 170 is associated with the control port 124. In a first position (as shown), the check valve permits communication between the control port and an upper face 172 of the relay piston via passage 174. In the first position, passage 176 is sealed by the check valve 170 so that the primary brake circuit port (i.e., on the upper face of the second piston 134) cannot communicate with the passage 174. In addition, a check valve 180 is urged by spring 182 toward a closed position and precludes communication between passage 176 and passage 184 that leads to the supply port.

The position of the valve components in FIG. 4 represent the system when it is charging and the pressure is below a predetermined level (here 105 psi). The control valve 70 is actuated by the operator and supplies a pneumatic control signal to control port 124. This seats the check valve 170 and provides air pressure to the relay piston surface 172. The air pressure acting over the relay piston surface exerts a force in a downward direction so that the inlet valve and seal surface 162 is lifted or spaced from the housing seat and provides communication between the supply port 112 and the delivery port 114 to the spring brakes. This provides pressurized air that retracts the mechanical spring brakes and releases the spring brakes to allow the wheels to roll freely.

Figure 5:
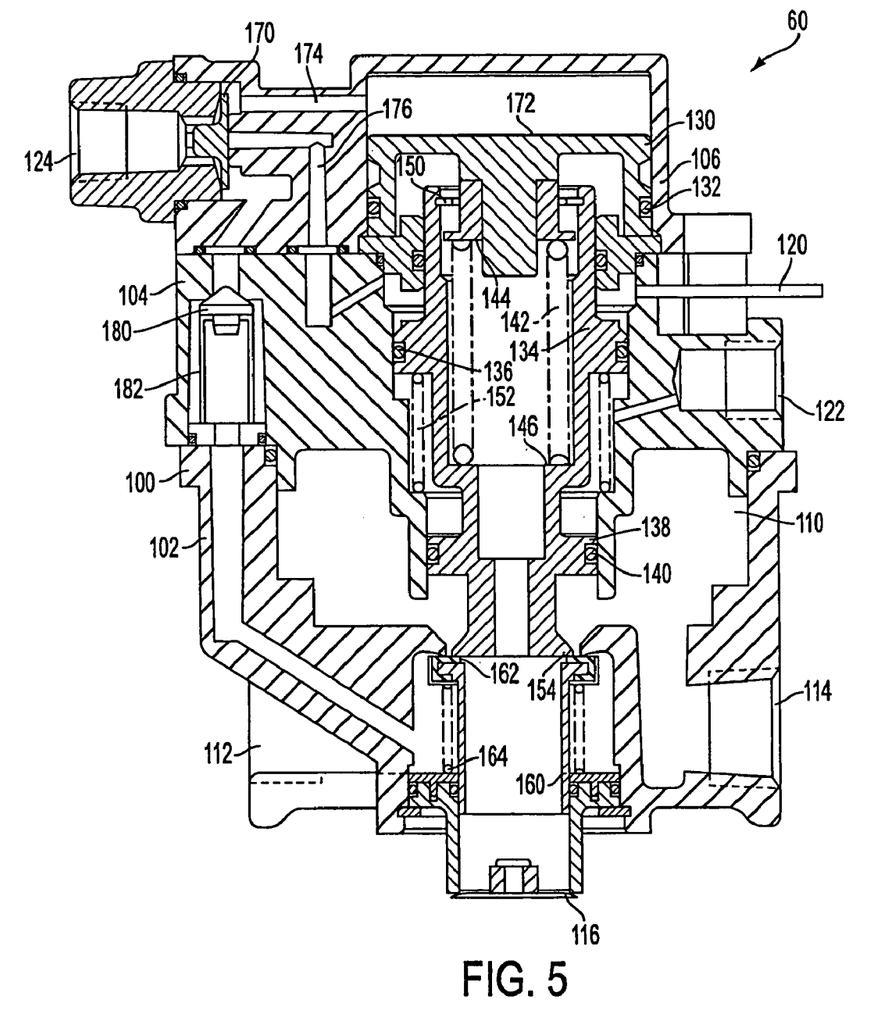
FIG. 5 is a view similar to that of FIG. 4, where the pressure has been elevated above 105 psi.

It is desired that the pressure to the spring brakes be limited to 105 psi. Accordingly, once that preselected pressure level is reached, the exhaust valve is urged to a sealed position with the valve seat (FIG. 5) and remains in contact with the lower portion of the modulating piston. This lapped position assures that only 105 psi is delivered to the spring brakes.

Figure 6:
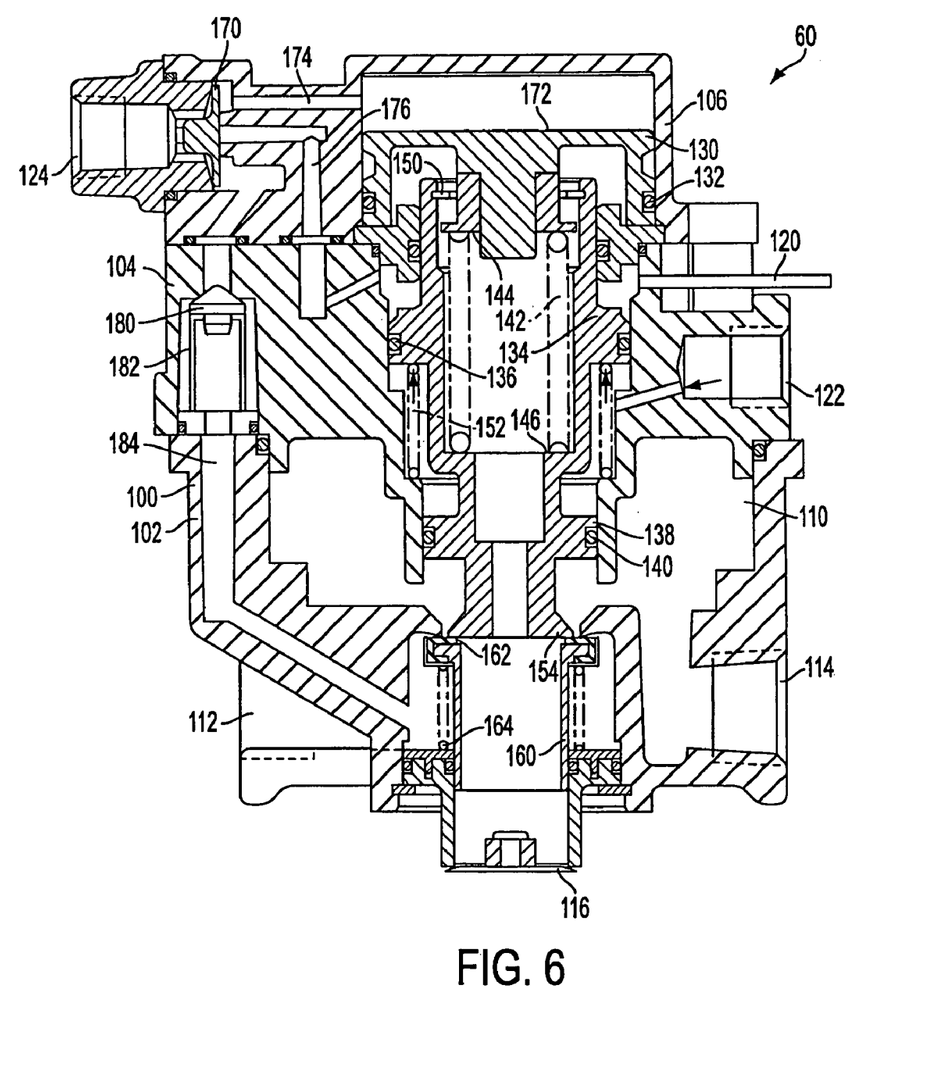
FIG. 6 illustrates normal service brake application.

A normal service application is illustrated in FIG. 6. Pressure is provided at the control port 124 to urge the relay piston 130 to its lower position as shown. In addition, air pressure is provided at the primary circuit port 120, as well as the secondary circuit port 122. This provides a balancing force on the modulating piston 134 so that it does not engage against the lower shoulder (e.g. as it does in FIG. 4), and instead remains in a balanced position as shown in FIG. 6. Thus, the pistons have moved relative to one another and the spring 142 is under compression. The spring brakes have already been released and are held in the release position due to the lapped arrangement between the sealing surface 162 and the housing. Likewise, the lower end of the modulating piston 134 is seated against the seal surface 162 to prevent communication with the exhaust port.

Figure 7:
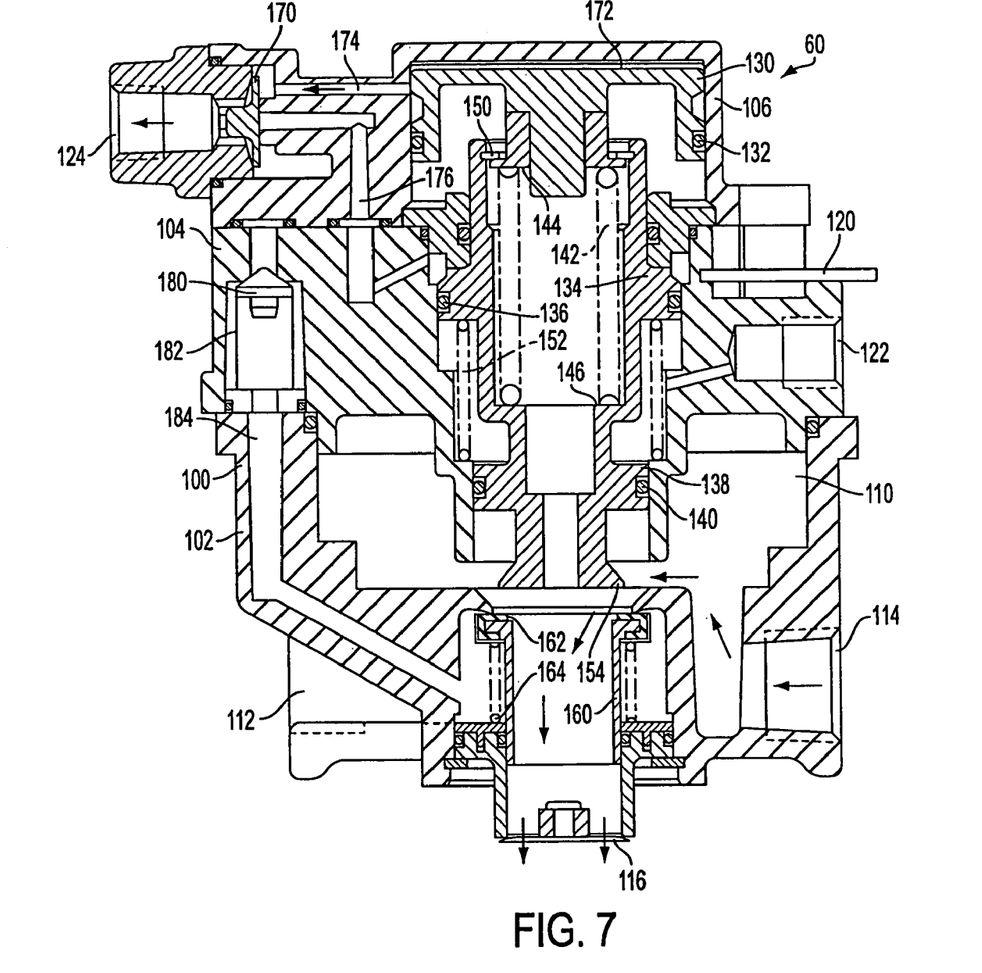
FIG. 7 illustrates the position of the valve components during system park.

To effect system park, no pressure is provided to the control port 124 or the primary and secondary circuit ports 120, 122, respectively. The components of the valve adopt the positions illustrated in FIG. 7. Note that the relay piston is urged to a second or upper position. Likewise, the modulating piston 134 is urged upwardly by the springs. This lifts the end of the modulating piston from its sealed engagement with the seat 162 and thereby establishes communication with the exhaust port 116. Thus, the air pressure which released the mechanical spring brakes is now free to communicate with ambient through the exhaust port and the spring brakes are applied. The pressure at the supply port 112 cannot communicate with the delivery port due to the closing force imposed by the spring 164.

Figure 8:
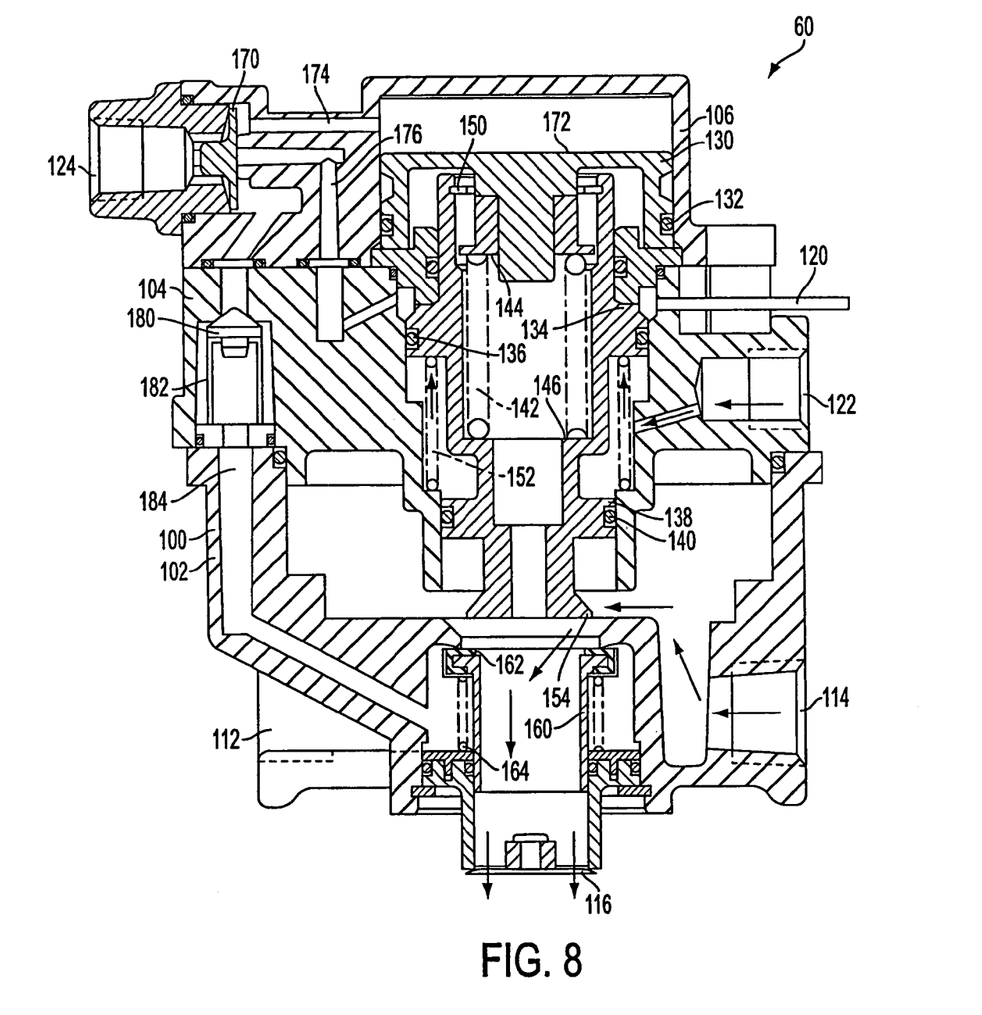
FIG. 8 illustrates service brake application where a failure has occurred in the primary brake circuit.

If a primary circuit brake failure occurs, the modulation function of the valve 60 comes into play. This is best illustrated in FIG. 8. The control port 124 is still pressurized and the air pressure urged the relay piston 130 toward its lower position. Because of the failure, there is no pressure at the primary port 120. Thus, the pressure at the secondary port 122 moves the modulating piston upwardly as shown. This lifts the modulating end of the piston from its sealed engagement with seal member 162, again establishing communication between the delivery port 114 and the exhaust port. Consequently, the mechanical springs can be applied through selective depression of the foot valve when the primary circuit has failed. This, of course, is a very desirable and beneficial feature of the valve assembly.

Figure 9:
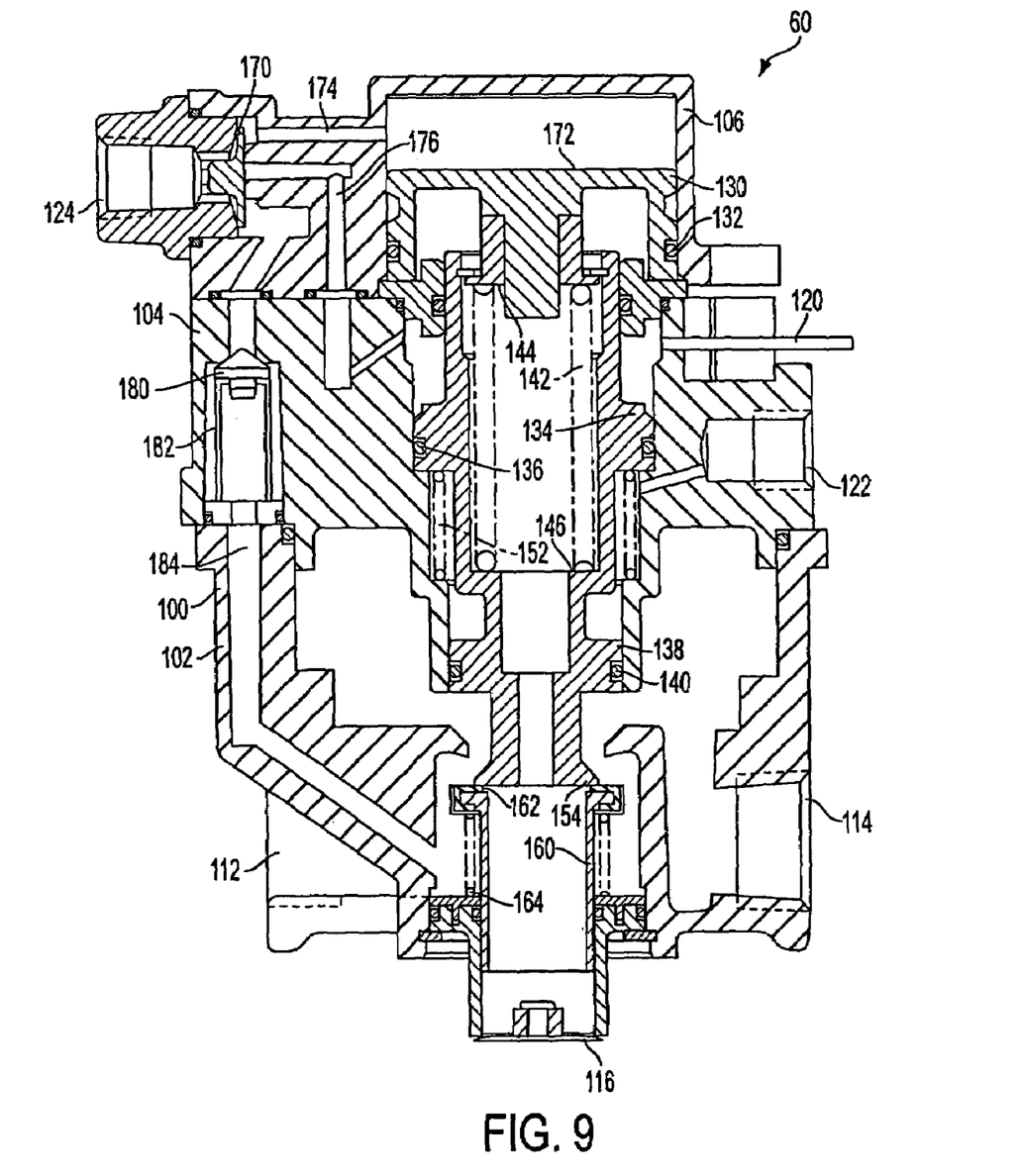
FIG. 9 shows the valve components where a failure in the secondary brake circuit has occurred.

If a failure occurs in the secondary circuit, and the primary circuit is still operative, the rear axle or drive brakes can still be operated. The modulating piston moves downwardly, as shown in FIG. 9, resulting in the supply reservoir pressure being delivered to the spring brakes. However, no modulation occurs since the service brakes are still operative and can satisfy safe stopping distance requirements.

Figure 10:
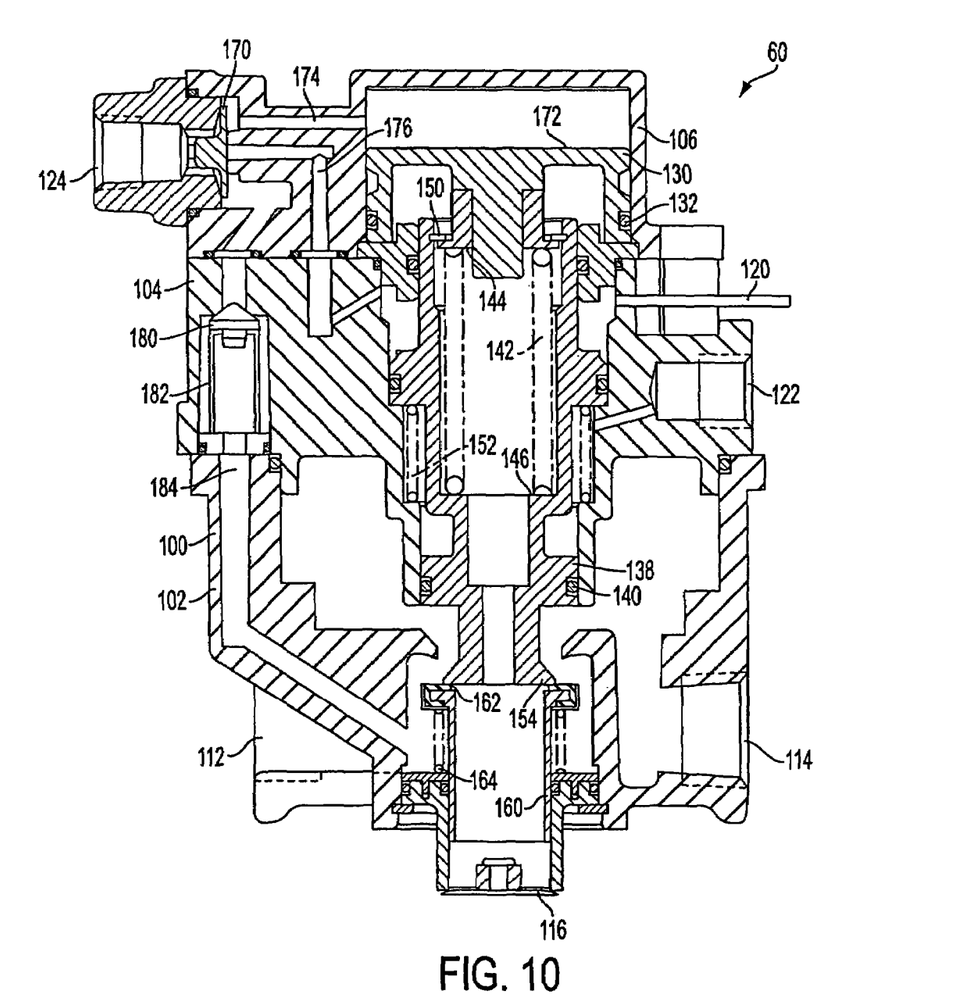
FIG. 10 illustrates the anti-compounding feature of the subject valve.

Another feature incorporated into the valve is generally referred to as anti-compounding (FIG. 10). That is, it is undesirable to apply both the spring brake and the normal service braking at the same time, i.e., compounding the brakes. To prevent this undesired result, an anti-compounding feature is incorporated into the valve assembly. For example, if the vehicle is parked, i.e., there is no air pressure at the control port 124, then air from the primary circuit drives the pistons downwardly by providing pressure to the upper face 172 of the relay piston. The lower end of the modulating piston moves the exhaust valve from its sealed position with the seat and thereby establishes communication between the supply port 112 and the delivery port 114. As will be recognized, this backs the spring brakes from the applied position and prevents compounding of the brake application.

Figure 11:
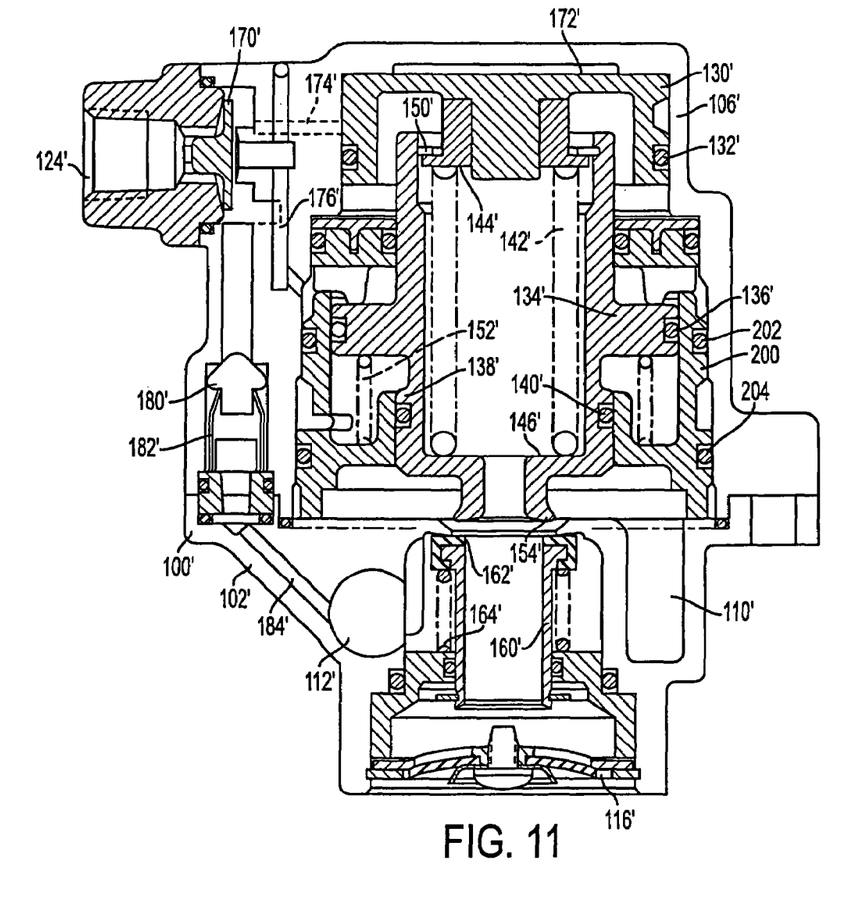
FIG. 11 is an illustration of another preferred embodiment of a combined spring brake modulating relay valve.

The valve of FIG. 11 is similar to that shown and described with reference to FIGS. 4–10. It is preferred from the standpoint, however, that a more compact assembly is provided since the intermediate housing portion is removed. Instead, an inner static piston 200 is received in a modified upper housing portion. As will be appreciated, the static piston 200 is sealed relative to the upper housing portion via O-ring seals 202, 204. It has an internal cavity that receives the sliding seals 136' and 140' of the modulating piston. In substantially all other respects, the correspondence between the valve of FIGS. 4–10 and that in FIG. 11 is exhibited through the use of components identified with a primed suffix ('). Accordingly, operation and function of the combined spring brake modulating relay valve of FIG. 11 is the same as described above.

The invention has been described with reference to the preferred embodiments. Obviously, modifications and alterations will become apparent to those skilled in the art. It is intended to include all such modifications and alterations insofar as they fall within the scope of the appended claims or the equivalents thereof.

Having thus described the invention, we claim:

1. A spring brake modulating relay valve, comprising:
   (a) a housing, said housing further comprising:
      a plurality of ports formed in said housing;
      an internal chamber in selective communication with said plurality of ports, and
      wherein said plurality of ports further comprises:
         (i) a supply port for receiving pressurized air, a delivery port, and an exhaust port formed in a lower portion of said housing;
         (ii) a port for a primary brake circuit and a port for a secondary brake circuit, said ports being formed in an intermediate portion of said housing; and
         (iii) a control signal port formed in an upper portion of said housing;
   (b) a relay piston mounted in said chamber, wherein said relay piston further comprises a first internal shoulder;
   (c) a modulating piston mounted in said chamber, wherein said modulating piston further comprising a second internal shoulder;
   (d) an auxiliary piston mounted in said chamber and forming an extension of a bottom portion of said modulating piston;
   (e) a first spring for engaging one side of said first internal shoulder and one side of said second internal shoulder, and wherein said first spring permits said relay and said modulating pistons to move as a unit under predetermined pressure conditions;
   (f) a retention ring for providing an abutment surface for an opposite side of said first shoulder and for defining the engagement between said relay and modulating pistons in an absence of air pressure;
   (g) a second spring mounted between said housing and said modulating piston for urging said relay, modulating, and auxiliary pistons toward a first or upper position;
   (h) an exhaust valve for engaging and forming a seal with said auxiliary piston;
   (i) a third spring for urging said exhaust valve toward a seated position within said housing such that said supply port cannot communicate with said delivery port;
   (j) a first check valve in communication with said control signal port normally biased for permitting communication between said control signal port and said relay piston and preventing communication between said control signal port and said primary brake circuit port; and
   (k) a second check valve normally biased to preclude communication between said control port and said supply port.

2. The spring brake modulating relay valve of claim 1, wherein said second check valve permits communication between said control port and said supply port in the event of a failure in said secondary brake circuit.

3. The spring brake modulating relay valve of claim 1, wherein said pressurized air may be received from a single, secondary air source or from primary and secondary sources of pressurized air.

4. A spring brake modulating relay valve, comprising:
   (a) a housing including a plurality of ports and an internal chamber in selective communication with said plurality of ports, the ports including:
      (i) a supply port for receiving pressurized air, a delivery port, and an exhaust port;
      (ii) a port for a primary brake circuit and a port for a secondary brake circuit; and
      (iii) a control signal port;
   (b) a relay piston mounted in said chamber, wherein said relay piston further comprises a first internal shoulder;
   (c) a modulating piston mounted in said chamber, wherein said modulating piston further comprising a second internal shoulder;
   (d) an auxiliary piston mounted in said chamber and forming an extension of a bottom portion of said modulating piston;
   (e) a first spring for engaging one side of said first internal shoulder and one side of said second internal shoulder, and wherein said first spring permits said relay and said modulating pistons to move as a unit under predetermined pressure conditions;
   (f) a retention ring for providing an abutment surface for an opposite side of said first shoulder and for defining the engagement between said relay and modulating pistons;
   (g) a second spring mounted between said housing and said modulating piston for urging said relay, modulating, and auxiliary pistons toward a first or upper position;
   (h) an exhaust valve for engaging and forming a seal with said auxiliary piston;
   (i) a third spring for urging said exhaust valve toward a seated position within said housing such that said supply port cannot communicate with said delivery port; and (j) a first check valve in communication with said control signal port normally biased for permitting communication between said control signal port and said relay piston and preventing communication between said control signal port and said primary brake circuit port.

5. The spring brake modulating relay valve of claim 4, wherein:
a pressure at the control signal port above a predetermined control pressure causes the modulating piston to be positioned for supplying pressurized air from the supply port to the delivery port for releasing an associated spring brake.

6. The spring brake modulating relay valve of claim 4, wherein:
the modulating piston is positioned for exhausting air from the delivery port and applying an associated spring brake if a pressure at the primary brake circuit port is below a predetermined primary pressure, a pressure at the secondary brake circuit port is above a predetermined secondary pressure, the pressure at the primary brake circuit port is less than the pressure at the secondary brake circuit port, and a pressure at the control signal port is above a predetermined control pressure.

7. The spring brake modulating relay valve of claim 6, wherein:
the modulating piston is positioned for supplying air from the supply port to the delivery port for releasing an associated spring brake if the pressure at the primary brake circuit port is substantially equal to the pressure at the secondary brake circuit port and the pressure at the control signal port is above the predetermined control pressure.

8. The spring brake modulating relay valve of claim 7, wherein:
the modulating piston modulates between being positioned for exhausting air from the delivery port and supplying air from the supply port to the delivery port as a function of the pressures at the primary brake circuit port and the secondary brake circuit port.

9. The spring brake modulating relay valve of claim 4, wherein:
the modulating piston is positioned for supplying air from the supply port to the delivery port for releasing an associated spring brake if a pressure at the primary brake circuit port is above a predetermined primary pressure, a pressure at the secondary brake circuit port is below a predetermined secondary pressure, and a pressure at the control signal port is above a predetermined control pressure.

10. The spring brake modulating relay valve of claim 4, wherein:
the modulating piston is positioned for supplying air from the supply port to the delivery port, for releasing an associated spring brake, when a pressure at the control signal port is below a predetermined control pressure and a pressure at the primary brake circuit port is above a predetermined primary pressure.

* * * * *